United States Patent
Kim et al.

(10) Patent No.: US 10,063,965 B2
(45) Date of Patent: Aug. 28, 2018

(54) SOUND SOURCE ESTIMATION USING NEURAL NETWORKS

(71) Applicant: Google Inc., Mountain View, CA (US)

(72) Inventors: Chanwoo Kim, Mountain View, CA (US); Rajeev Conrad Nongpiur, Palo Alto, CA (US); Arun Narayanan, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/170,348

(22) Filed: Jun. 1, 2016

(65) Prior Publication Data

US 2017/0353789 A1     Dec. 7, 2017

(51) Int. Cl.
| | | |
|---|---|---|
| *G10L 25/30* | (2013.01) | |
| *H04R 3/00* | (2006.01) | |
| *H04R 5/027* | (2006.01) | |

(52) U.S. Cl.
CPC .............. *H04R 3/005* (2013.01); *G10L 25/30* (2013.01); *H04R 5/027* (2013.01); *H04R 2201/401* (2013.01); *H04R 2430/20* (2013.01)

(58) Field of Classification Search
CPC .. H04R 3/005; H04R 5/027; H04R 2201/401; G10L 25/30
See application file for complete search history.

(56) References Cited

U.S. PATENT DOCUMENTS

| | | |
|---|---|---|
| 5,473,759 A | 12/1995 | Slaney et al. |
| 6,366,679 B1 | 4/2002 | Steffen et al. |
| 7,287,014 B2 | 10/2007 | Chen et al. |
| 7,783,054 B2 | 8/2010 | Ringlstetter et al. |
| 7,805,286 B2 | 9/2010 | Jorgensen et al. |
| 8,527,276 B1 | 9/2013 | Senior et al. |
| 8,676,728 B1 * | 3/2014 | Velusamy ............. H04R 1/406 706/12 |
| 8,964,996 B2 | 2/2015 | Klippel et al. |

(Continued)

FOREIGN PATENT DOCUMENTS

| | | |
|---|---|---|
| EP | 2362238 B1 | 6/2014 |
| WO | 2002052895 A1 | 7/2002 |

OTHER PUBLICATIONS

Arslan, Güner, and F. Ayhan Sakarya. "A unified neural-network-based speaker localization technique." IEEE Transactions on Neural Networks 11.4 (2000): 997-1002.*

Kleiner, Mendel, Bengt-Inge Dalenbäck, and Peter Svensson. "Auralization—an overview." Journal of the Audio Engineering Society 41.11 (1993): 861-875.*

Liu, Hong, and Miao Shen. "Continuous sound source localization based on microphone array for mobile robots." Intelligent Robots and Systems (IROS), 2010 IEEE/RSJ International Conference on. IEEE, 2010.*

(Continued)

*Primary Examiner* — Jialong He
(74) *Attorney, Agent, or Firm* — Morris & Kamlay LLP

(57) ABSTRACT

A system for estimating the location of a stationary or moving sound source includes multiple microphones, which need not be physically aligned in a linear array or a regular geometric pattern in a given environment, an auralizer that generates auralized multi-channel signals based at least on array-related transfer functions and room impulse responses of the microphones as well as signal labels corresponding to the auralized multi-channel signals, a feature extractor that extracts features from the auralized multi-channel signals for efficient processing, and a neural network that can be trained to estimate the location of the sound source based at least on the features extracted from the auralized multi-channel signals and the corresponding signal labels.

27 Claims, 8 Drawing Sheets

(56) References Cited

U.S. PATENT DOCUMENTS

| | | | |
|---|---|---|---|
| 9,177,550 B2 | 11/2015 | Yu et al. | |
| 9,269,045 B2 | 2/2016 | Krishnan et al. | |
| 9,591,427 B1* | 3/2017 | Lyren | H04S 7/304 |
| 2011/0038229 A1* | 2/2011 | Beaucoup | G01S 3/8083 367/119 |
| 2011/0169664 A1* | 7/2011 | Berger | G01H 3/08 340/943 |
| 2011/0222707 A1* | 9/2011 | Hwang | H04R 3/005 381/92 |
| 2014/0044279 A1* | 2/2014 | Kim | G10L 21/0272 381/92 |
| 2014/0142929 A1 | 5/2014 | Seide et al. | |
| 2015/0380013 A1* | 12/2015 | Nongpiur | G10L 25/51 704/231 |
| 2016/0109284 A1 | 4/2016 | Hammershoi et al. | |
| 2016/0379456 A1* | 12/2016 | Nongpiur | G08B 13/1672 340/541 |
| 2017/0061981 A1* | 3/2017 | Nakadai | G10L 21/028 |

OTHER PUBLICATIONS

Venegas, R., et al. "Spatial Sound Localization model using neural network." 120th AES Convention, Paris, France. 2006.*

Neti, Chalapathy, Eric D. Young, and Michael H. Schneider. "Neural network models of sound localization based on directional filtering by the pinna." The Journal of the Acoustical Society of America 92.6 (1992): 3140-3156.*

Datum, Michael S., Francesco Palmieri, and Andrew Moiseff. "An artificial neural network for sound localization using binaural cues." The Journal of the Acoustical Society of America 100.1 (1996): 372-383.*

Brandstein, et al., "A Robust Method for Speech Signal Time-Delay Estimation in Reverberant Rooms", ICASSP-97, Munich, Germany 1997, p. 376.

Dibiase, et al., "Robust Localization in Reverberant Rooms", in M. Brandstein and D. Ward editors, Microphone Arrays: Techniques and Applications, pp. 157-180. Springer-Verlag, 2001., 2001, pp. 157-180.

* cited by examiner

SOUND SOURCE ESTIMATION USING NEURAL NETWORKS

BACKGROUND

Various signal processing techniques have been developed for estimating the location of a sound source by using multiple microphones. Such techniques typically assume that the microphones are located in free space with a relatively simple geometric arrangement, such as a linear array or a circular array, which makes it relatively easy to analyze detected sound waves. However, in some situations, microphones may not be arranged in a linear or circular array. For example, microphones may be randomly positioned at various locations across a device of an arbitrary shape in a given environment instead of being positioned in a linear or circular array. Sound waves may be diffracted and scattered across the device before they are detected by the microphones. Scattering effects, reverberations, and other linear and nonlinear effects across an arbitrarily shaped device may complicate the analysis involved in estimating the location of a sound source.

BRIEF SUMMARY

According to an embodiment of the disclosed subject matter, a method of estimating the location of a sound source includes generating a plurality of auralized signals based at least on a plurality of array-related transfer functions of a plurality of microphones in response to a sound event generated by a sound source and a plurality of room impulse responses of the plurality of microphones; generating a plurality of labels corresponding to the plurality of auralized signals, each of the plurality of labels including at least spatial information regarding an estimated location of the sound source; extracting a plurality of features from the plurality of auralized signals, each of the features including at least information regarding a magnitude and a phase of a corresponding one of the plurality of auralized signals; and training a neural network for estimating a location of the sound source based at least on the plurality of features and the plurality of labels.

According to an embodiment of the disclosed subject matter, an apparatus for estimating the location of a sound source includes a memory and a processor communicably coupled to the memory. In an embodiment, the processor is configured to execute instructions to generate a plurality of auralized signals based at least on a plurality of array-related transfer functions of a plurality of microphones in response to a sound event generated by a sound source and a plurality of room impulse responses of the plurality of microphones; generate a plurality of labels corresponding to the plurality of auralized signals, each of the plurality of labels including at least spatial information regarding an estimated location of the sound source; extract a plurality of features from the plurality of auralized signals, each of the features including at least information regarding a magnitude and a phase of a corresponding one of the plurality of auralized signals; and train a neural network for estimating a location of the sound source based at least on the plurality of features and the plurality of labels.

According to an embodiment of the disclosed subject matter, a sound system includes a plurality of microphones; an auralizer configured to generate a plurality of auralized signals based at least on a plurality of array-related transfer functions of the plurality of microphones in response to a sound event generated by a sound source and a plurality of room impulse responses of the plurality of microphones; and a plurality of labels corresponding to the plurality of auralized signals, each of the plurality of labels including at least spatial information regarding an estimated location of the sound source; a feature extractor configured to extract a plurality of features from the plurality of auralized signals, each of the features including at least information regarding a magnitude and a phase of a corresponding one of the plurality of auralized signals; and a neural network comprising one or more layers configured to be trained for estimation of a location of the sound source based at least on the plurality of features and the plurality of labels.

According to an embodiment of the disclosed subject matter, means for estimating the location of a sound source are provided, which includes means for generating a plurality of auralized signals based at least on a plurality of array-related transfer functions of a plurality of microphones in response to a sound event generated by a sound source and a plurality of room impulse responses of the plurality of microphones; means for generating a plurality of labels corresponding to the plurality of auralized signals, each of the plurality of labels including at least spatial information regarding an estimated location of the sound source; means for extracting a plurality of features from the plurality of auralized signals, each of the features including at least information regarding a magnitude and a phase of a corresponding one of the plurality of auralized signals; and means for training a neural network for estimating a location of the sound source based at least on the plurality of features and the plurality of labels.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
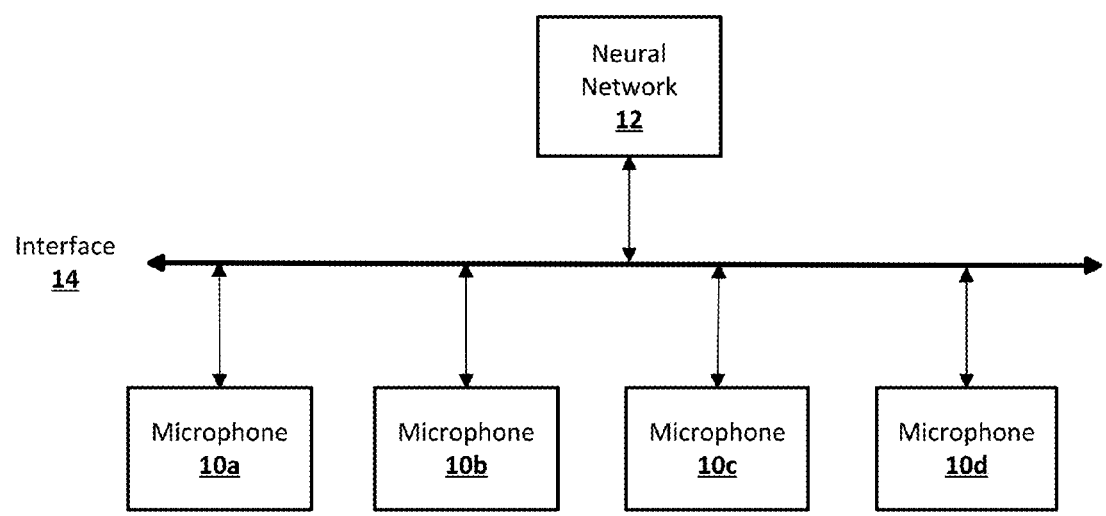
FIG. 1 shows a block diagram illustrating an example of a sound system which includes multiple microphones coupled to a neural network through an interface according to embodiments of the disclosed subject matter.

According to embodiments of this disclosure, methods and apparatus are provided for estimating the location of a sound source, which may be a stationary or moving sound source, by using multiple microphones. In the foregoing description, multiple microphones may be collectively referred to as an "array" of microphones, but the disclosed subject matter need not be limited to physical placements of microphones along a line or multiple lines. An "array" of microphones may include microphones placed in various physical locations of an arbitrarily shaped device in an indoor environment such as a smart-home environment, or in another type of enclosed environment. Sound waves may experience scattering effects, diffractions, reverberations, or other linear or nonlinear effects before they are detected by the microphones. According to embodiments of the disclosure, a sound detection system includes a neural network that is trained to estimate the location of a sound source in a three-dimensional space in a given environment based on sound signals detected by multiple microphones without being dependent on conventional schemes for determining the source of a sound which are limited to relatively simple geometric arrangements of microphones, for example, linear or circular arrays with no obstructions or objects that may absorb, reflect, or distort sound propagation. An "auralizer" is implemented to generate multi-channel "auralized" sound signals based at least on impulse responses of the microphone array in an anechoic chamber and in a room environment, which may be an actual or simulated room environment as well as other inputs which will be described in detail with reference to FIG. 4. As used herein, "auralization" refers to a process of rendering audio data by digital means to achieve a virtual three-dimensional sound space. Training a neural network with auralized multi-channel signals allows the neural network to capture the scattering effects of the multi-microphone array, other linear or non-linear effects, reverberation times in a room environment, as well as manufacturing variations between different microphones in the multi-microphone array. After being trained with data derived from the auralized multi-channel signals, the neural network may compute the complex coefficients, which will be described in detail below, to estimate the direction or location of an actual sound source in a three-dimensional space with respect to the multi-microphone array. In some implementations, in addition to detecting the direction or location of the sound source, the neural network may also be trained and used as speech detector or a sound classifier to detect whether the received sound signal is or contains a speech based on comparisons with a speech database, such as the TIMIT database, which contains phonemically and lexically transcribed speeches of American English speakers of different genders and dialects and is known to persons skilled in the art.

In some implementations, sound signals from stationary or moving sound sources may be auralized to generate auralized multi-channel sound signals. In an embodiment, auralization of sound signals may involve obtaining anechoic impulse responses of the multi-microphone array, also called array-related transfer functions (ARTFs), across a dense grid of three-dimensional coordinates, such as spherical coordinates, Cartesian coordinates, or cylindrical coordinates, and combining the ARTFs with responses from a room simulator and transfer functions indicative of microphone variations to generate auralized multi-channel sound signals.

In some implementations, auralized multi-channel sound signals may be passed through a feature extraction module, also called a feature extractor, which transforms the auralized signals into "features" that are efficient numerical representations of the auralized signals for training the neural network. In addition to the signal features, "labels" for the features may be provided for a sound source. A "label" may include spatial information indicative of an estimated location of the sound source. For example, a label may include azimuth, elevation and distance in spherical coordinates if the sound source is stationary. Other types of three-dimensional coordinates such as Cartesian coordinates or cylindrical coordinates may also be used. If the sound source is moving, then a set of labels each corresponding to a given time frame may be provided. The neural network may be trained by receiving, processing, and learning from multiple sound features and their associated labels or sets of labels for stationary or moving sound sources to allow the sound detection system to estimate the locations of actual stationary or moving sound sources in a room environment.

FIG. 1 shows a block diagram illustrating an example of a sound system which includes multiple microphones 10*a*, 10*b*, 10*c* and 10*d* coupled to a neural network 12 through an interface 14. Although the microphones 10*a*, 10*b*, 10*c* and 10*d* may be collectively referred to as an "array" of microphones, they may but need not be physically placed in a linear array in a given environment.

Figure 2:
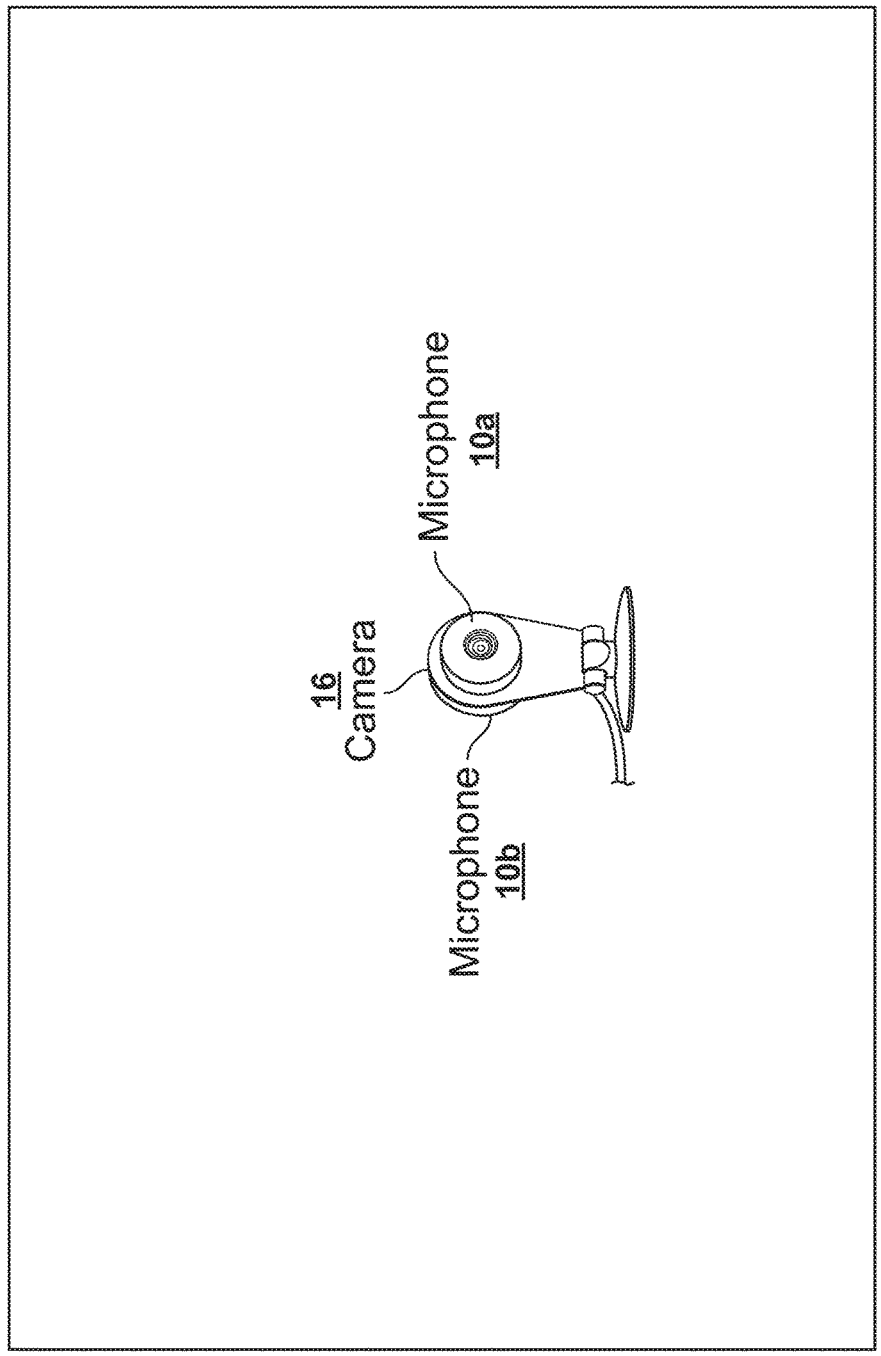
FIG. 2 shows an example of two microphones in an arbitrarily shaped device positioned in an anechoic chamber.
Figure 4:
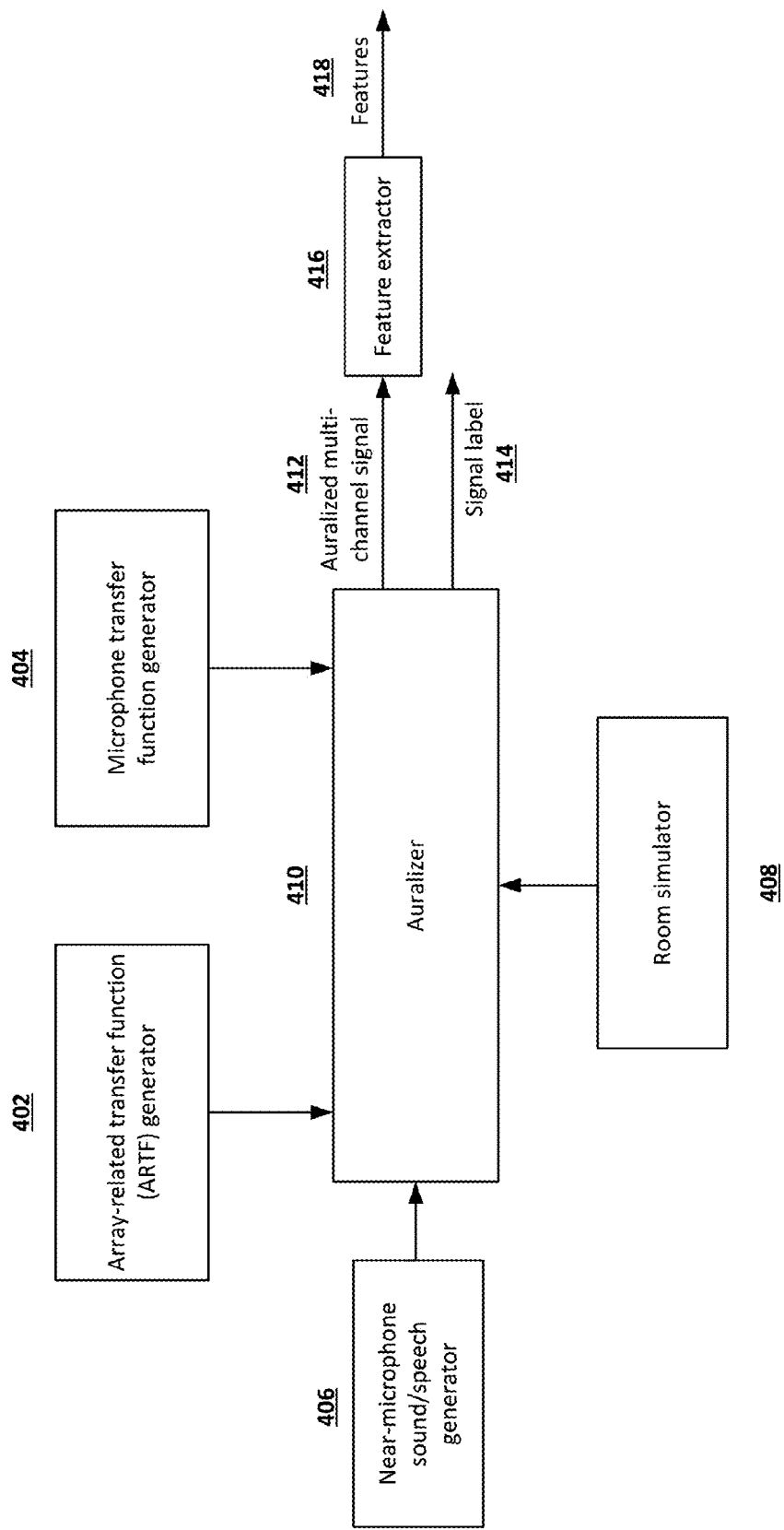
FIG. 4 shows an example of a system for generating auralized multi-channel signals and corresponding labels.

FIG. 2 shows an example of two microphones 10*a* and 10*b* in an arbitrarily shaped device, such as a video camera 16, positioned in an anechoic chamber 200, which is a chamber with walls that absorb sound waves perfectly or nearly perfectly, for training a neural network for sound source estimation. As described above, the "array" of microphones need not be arranged in a linear, circular, or other regular geometric pattern, and the device in which the microphones are located may be of an arbitrary shape. Although FIG. 2 illustrates an arbitrarily shaped video camera 16 with two microphones 10*a* and 10*b*, more than two microphones may be provided within the scope of the disclosure. The anechoic chamber 200 may be an anechoic chamber for obtaining array-related transfer functions (ARTFs), which may be generated by an ARTF generator 402 as shown in FIG. 4 and described below. Array-related transfer functions (ARTFs) are also known as anechoic impulse responses of the microphones 10*a* and 10*b* in the anechoic chamber 200. There may be a unique ARTF at a given point in space within the anechoic chamber 200. In some implementations, ARTFs may be obtained over a dense grid of three-dimensional coordinates, for example, a dense grid of spherical coordinates of azimuth, elevation and distance, in a three-dimensional space. Alternatively or in addition, ARTFs may be obtained across a dense grid of three-dimensional Cartesian or cylindrical coordinates.

Figure 3:
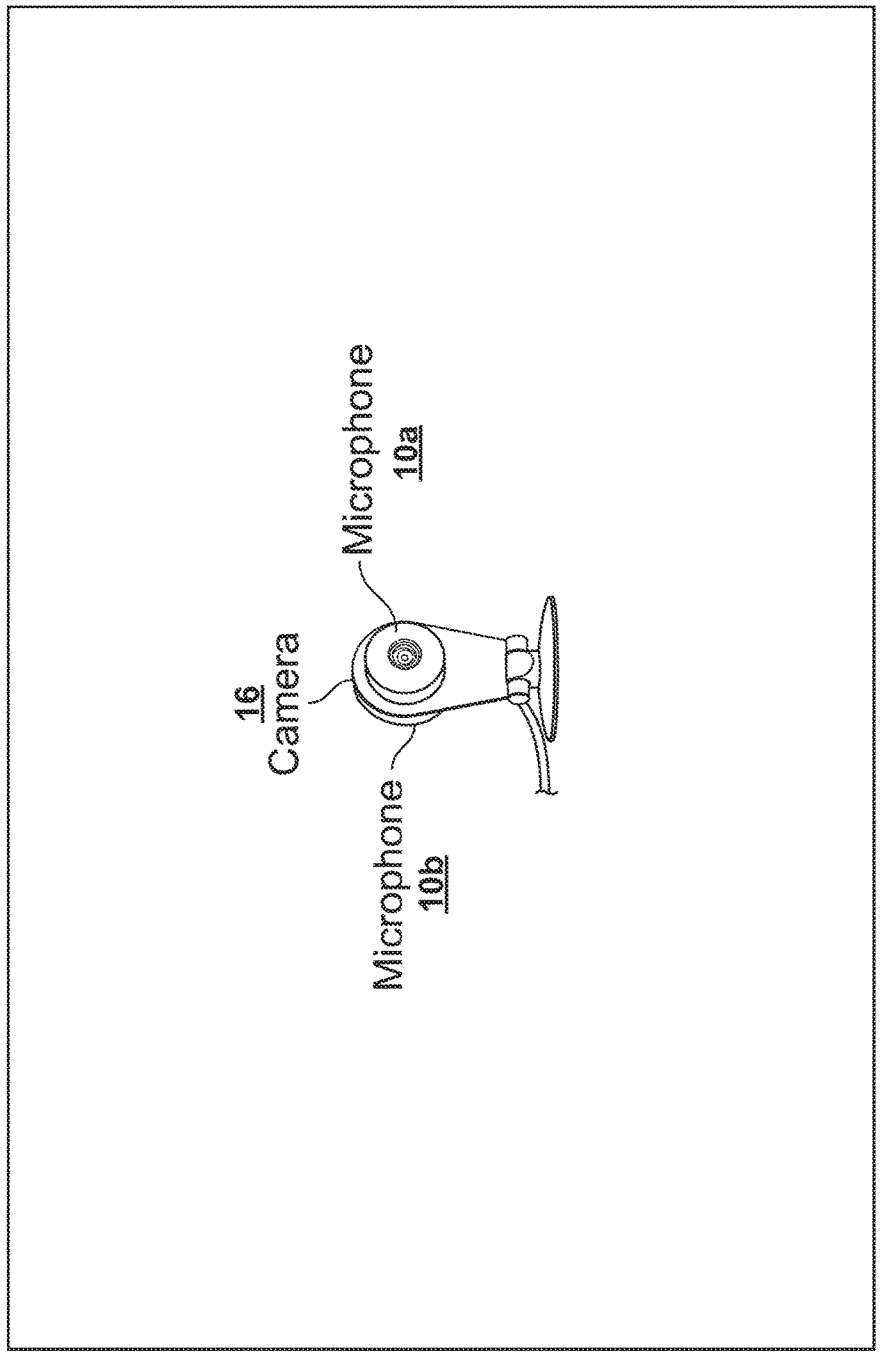
FIG. 3 shows an example of two microphones in an arbitrarily shaped device positioned in a real or simulated room environment.

FIG. 3 shows an example of two microphones 10*a* and 10*b* in an arbitrarily shaped device, such as a video camera 16, positioned in a real or simulated room environment 300. The arbitrarily shaped video camera 16 which houses the microphones 10*a* and 10*b* is positioned in the same manner in the room environment 300 as in the anechoic chamber 200 in FIG. 2. Although FIG. 3 illustrates an arbitrarily shaped video camera 16 with two microphones 10a and 10b, more than two microphones may be provided within the scope of the disclosure. Various effects such as scattering effects, room reverberations or other linear or nonlinear effects may be present across the arbitrarily shaped device.

In some implementations, the room environment 300 for the microphones 10a and 10b may be simulated by a room simulator 408 as shown in FIG. 4 and described below. In some implementations, the room simulator may be implemented to generate room impulse responses that take into account the various effects of the actual room environment, including scattering effects, reverberation times, or other linear or nonlinear effects. Like the ARTFs or anechoic impulse responses, the room impulse responses generated by the room simulator may be obtained across a dense grid of three-dimensional coordinates, for example, a dense grid of spherical coordinates of azimuth, elevation and distance. Alternatively or in addition, ARTFs may be obtained across a dense grid of three-dimensional Cartesian or cylindrical coordinates. Because the room impulse responses take into account various effects of the actual room environment, they are expected to be different from the ARTFs at corresponding points in space.

FIG. 4 shows an example of a system for generating auralized multi-channel signals and corresponding labels. In FIG. 4, an auralizer 410 has multiple inputs, including inputs from an ARTF generator 402, a microphone transfer function generator 404, a near-microphone sound/speech generator 406, and a room simulator 408. The ARTF generator 402 may be implemented to generate ARTFs, which are anechoic impulse responses of the multi-microphone array in an anechoic chamber, an example of which is described above with reference to FIG. 2. The ARTFs may be obtained across a dense grid of three-dimensional coordinates, which may be Cartesian coordinates, cylindrical coordinates, or spherical coordinates, in a three-dimensional space.

In some implementations, it is expected that individual microphones in a multi-microphone array may have different response characteristics. Even if the microphones in the multi-microphone array are of the same make and model, there may be slight differences in their response characteristics due to manufacturing variations, for example. A microphone transfer function generator 404 may be implemented to generate microphone transfer functions, which take into account the response characteristics of individual microphones in the multi-microphone array. Microphone transfer functions may be generated by using conventional schemes known to persons skilled in the art. A near-microphone sound/speech generator 406 may be implemented to generate sounds or speeches to be transmitted to the auralizer 410. In some implementations, the near-microphone sound/speech generator 406 may generate reference sound signals for the auralizer 410. The near-microphone sound/speech may be a "clean" single-channel sound generated by a speech database, such as the TIMIT database which contains phonemically and lexically transcribed speeches of American English speakers of different genders and dialects. Alternatively or in addition, noises that are typically present in a home environment, for example, noises generated by one or more fans, air conditioners, appliances or home electronics may be added to the near-microphone sound or speech to simulate room environments realistically.

As shown in FIG. 4, a room simulator 408 is implemented to generate room impulse responses of the multi-microphone array by simulating an actual room environment. Sound signals in an actual room environment may experience various effects including scattering effects, reverberations, reflections, refractions, absorptions, or other linear or nonlinear effects. The room simulator 408 may take into account the various effects that sound signals of various frequencies may experience in the actual room environment. In some implementations, impulses responses obtained in an actual room environment may be obtained as an alternative or an augmentation to the impulse responses obtained by the room simulator 408. In some implementations, room impulse responses of the multi-microphone array may be obtained over the same dense grid of three-dimensional coordinates, which may be Cartesian coordinates, cylindrical coordinates or spherical coordinates, as the coordinates used for obtaining ARTFs or anechoic impulse responses generated by the ARTF generator 402. The auralizer 410 generates auralized multi-channel signals 412 and signal labels 414 corresponding to the auralized multi-channel signals 412 based on the inputs from the ARTF generator 402, the microphone transfer function generator 404, the near-microphone sound/speech generator 406, and the room simulator 408.

In some implementations, the auralizer 410 may generate auralized multi-channel signals from not only a stationary sound source but also a moving sound source. For example, a moving sound source may be a person who is talking and walking at the same time, or an animal that is barking and running at the same time. For a stationary sound source, the ARTFs may be obtained across a dense grid of three-dimensional coordinates and the room impulse responses may be obtained across the same grid of coordinates without being dependent on time as a variable. On the other hand, for a moving sound source, the ARTFs and the room impulse responses may be obtained across a dense grid of three-dimensional coordinates over time, and each ARTF and each room impulse response at a given point in space may vary as a function of time. In some implementations, the ARTFs and the room impulse responses may be regarded as having a fourth dimension of time in addition to the three dimensions of space.

In some implementations, the auralized multi-channel signals generated by the auralizer 410 may pass through a feature extractor 416 to extract "features" 418 that would provide efficient training for the neural network. The "features" may include various representations of complex values extracted from the auralized multi-channel signals through various transformations.

In one implementation, a feature extracted from an auralized signal may include a log magnitude and a phase of the signal. For example, the log magnitude and the phase of an auralized signal [$M_c$, $\theta_c$] in the cth channel may be defined, respectively, as $$M_c = 20 \log|X_c(\omega_k, n)|$$

$$\theta_c = \arg[X_c(\omega_k, n)]$$

where $X_c(\omega_k, n)$ corresponds to the nth frame and kth frequency bin of the spectrogram of the signal in the cth channel. An example of spectrograms with multiple frames, multiple frequency bins and multiple microphone channels will be described in detailed below with reference to FIG. 6.

In one implementation, a feature may include a log magnitude and an inter-channel phase difference [$M_c$, $\Delta\theta_c$]. The log magnitude $M_c$ may be defined in the same manner as above. The inter-channel phase difference $\Delta\theta_c$ may be defined as $$\Delta\theta_c = \theta_c - \theta_r$$

where $\theta_c$ is the phase of the signal in the cth channel, and $\theta_r$ is the phase of the signal in a reference channel.

In one implementation, a feature may include a log magnitude and an inverse-frequency-weighted inter-channel phase difference $[M_c, \eta_c]$. The log magnitude $M_c$ may be defined in the same manner as above. The inverse-frequency-weighted inter-channel phase difference may be defined as $$\eta_c = \frac{(\theta_c - \theta_r)}{\omega_k}$$

where $\omega_k$ is the angular frequency of the kth bin, $\theta_c$ is the phase of the signal in the cth channel, and $\theta_r$ is the phase of the signal in a reference channel.

In one implementation, a feature may include a log magnitude and sine/cosine of a phase $[M_c, \zeta_c, \xi_c]$ for a signal in the cth channel. The sine and cosine of the phase may be defined as $$\zeta_c = \sin(\theta_c)$$

$$\xi_c = \cos(\theta_c)$$

In one implementation, a feature may include a log magnitude and a difference of the sine/cosine of the phase $[M_c, \Delta\zeta_c, \Delta\xi_c]$ for a signal in the cth channel. The difference of the sine and cosine of the phase may be defined as $$\Delta\zeta_c = \zeta_c - \zeta_r$$

$$\Delta\xi_c = \xi_c - \xi_r$$

where $\zeta_r$ and $\xi_r$ are the sine and cosine of the phase of the signal in the reference channel, respectively.

In one implementation, a feature may include a log magnitude and sine/cosine of the inter-channel phase difference $[M_c, \vartheta_c, \kappa_c]$ for a signal in the cth channel. The sine and cosine of the inter-channel phase difference may be defined as $$\vartheta_c = \sin(\Delta\theta_c)$$

$$\kappa_c = \cos(\Delta\theta_c)$$

where $\theta_c$ is the phase of the signal in the cth channel.

In one implementation, a feature may include a discrete Fourier transform (DFT) of $[X_c(\omega_k, n)]$, where $X_c(\omega_k, n)$ corresponds to the nth frame and kth frequency bin of the spectrogram of the signal in the cth channel. In this implementation, the input layer of the neural network may need to be modified to accept complex inputs.

In one implementation, a feature may include real and imaginary components of a
DFT of $[\chi_R, \chi_I]$, where the real and imaginary components may be defined as $$\chi_R = \Re[X_c(\omega_k, n)]$$

$$\chi_I = \Im[X_c(\omega_k, n)]$$

For sound source estimation using multiple microphones, the phase relationships between the multi-channel signals may be as important as the magnitudes of the signals. In the various implementations described above, the phases of the signals may be expressed in various forms, such as absolute phases, phase differences with respect to a reference channel, inverse-frequency-weighted phase differences with respect to a reference channel, sines and cosines of phases, and so on. In the implementations described above, the magnitudes of multi-channel signals are express as log magnitudes because human ears are expected to detect sound volumes in a log scale rather than a linear scale. Alternatively or in addition, other representations of magnitudes may also be used, for example, log-mel magnitudes as known in music.

As shown in FIG. 4, the auralizer 410 may generate corresponding signal labels 414 in addition to the auralized multi-channel signals 412. A label may be provided for a corresponding feature extracted from a corresponding auralized multi-channel signal. In one implementation, a label for a corresponding feature may include spatial information on the sound source. For example, in spherical coordinates, the label for each corresponding signal feature may include the azimuth, elevation and distance of the sound source from a given microphone in the multi-microphone array. Other three-dimensional coordinates such as Cartesian coordinates or cylindrical coordinates may also be used.

If the sound source is stationary, then a sound event comprising signal features from multiple microphones may be labeled by a single set of labels comprising azimuth, elevation and distance values. However, if the sound source is moving, multiple sets of labels may be provided, with each set of labels comprising azimuth, elevation and distance values of sound features from multiple microphones within a corresponding time frame. In some instances, when a sound source moves away from a microphone array, signals from the sound source become far-field, and the estimation of the distance of the sound source with respect to the microphone array may become more inaccurate. To improve the accuracy of distance estimation of a far-field sound source, the distances of the sound source with respect to microphones in the multi-microphone array may be sampled non-uniformly with finer resolutions in the distance domain, for example.

Figure 5:
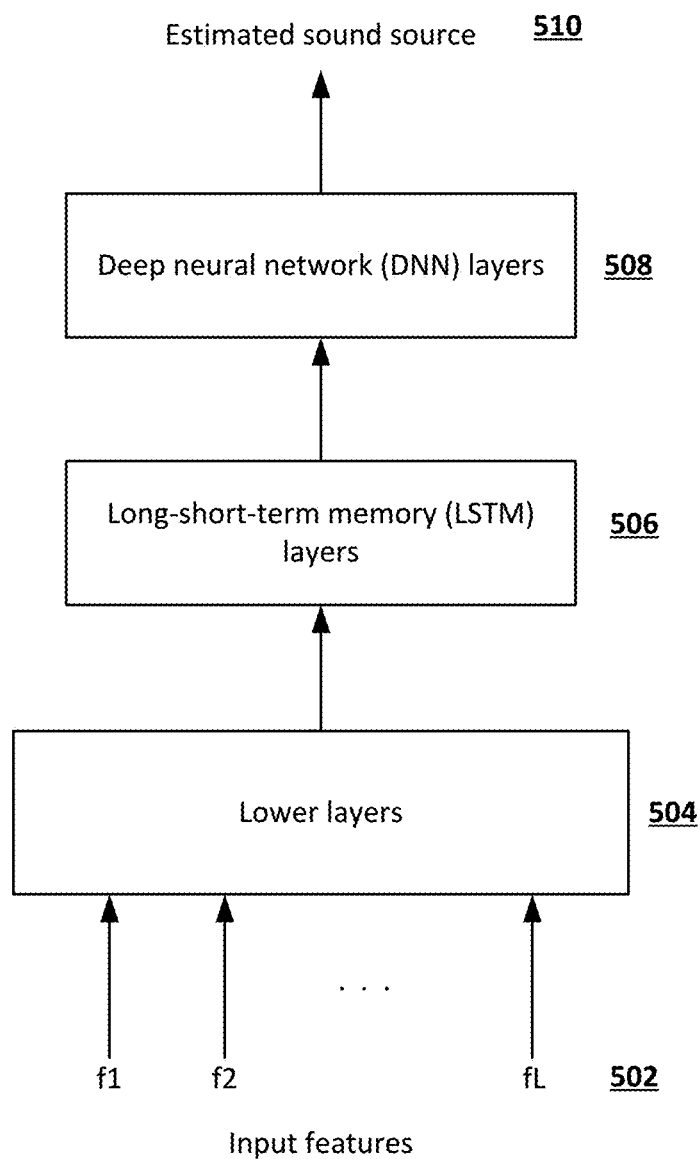
FIG. 5 shows an example of a neural network architecture.

In some implementations, a neural network architecture may be constructed with a sufficient number layers and nodes within each layer such that it can model the characteristics of the multi-microphone array with sufficient accuracy when trained with auralized multi-channel sound signals. FIG. 5 shows an example of a neural network architecture in which features extracted from auralized multi-channel signals are provided as inputs (f1, f2, . . . fL) 502 to one or more lower layers 504, one or more long-short-term memory (LSTM) layers 506, and one or more deep neural network (DNN) layers 508, to estimate the location of the sound source 510. Various types of neural network layers may be implemented within the scope of the disclosure. For example, alternative or in addition to the DNN layers, one or more convolutional neural network (CNN) layers or LSTM layers may be implemented. In some instances, various types of filters such as infinite impulse response (IIR) filters, linear predictive filters, Kalman filters, or the like may be implemented in addition to or as part of one or more of the neural network layers.

For tracking moving sound sources, a neural network architecture with an "attention mechanism" may be implemented. The performance of such an architecture may be dependent on the generation of good tracking data to train the neural network over a period of time, in which features extracted from the auralized multi-channel sound signals and their corresponding sets of labels over multiple time frames are received by the neural network.

Figure 6:
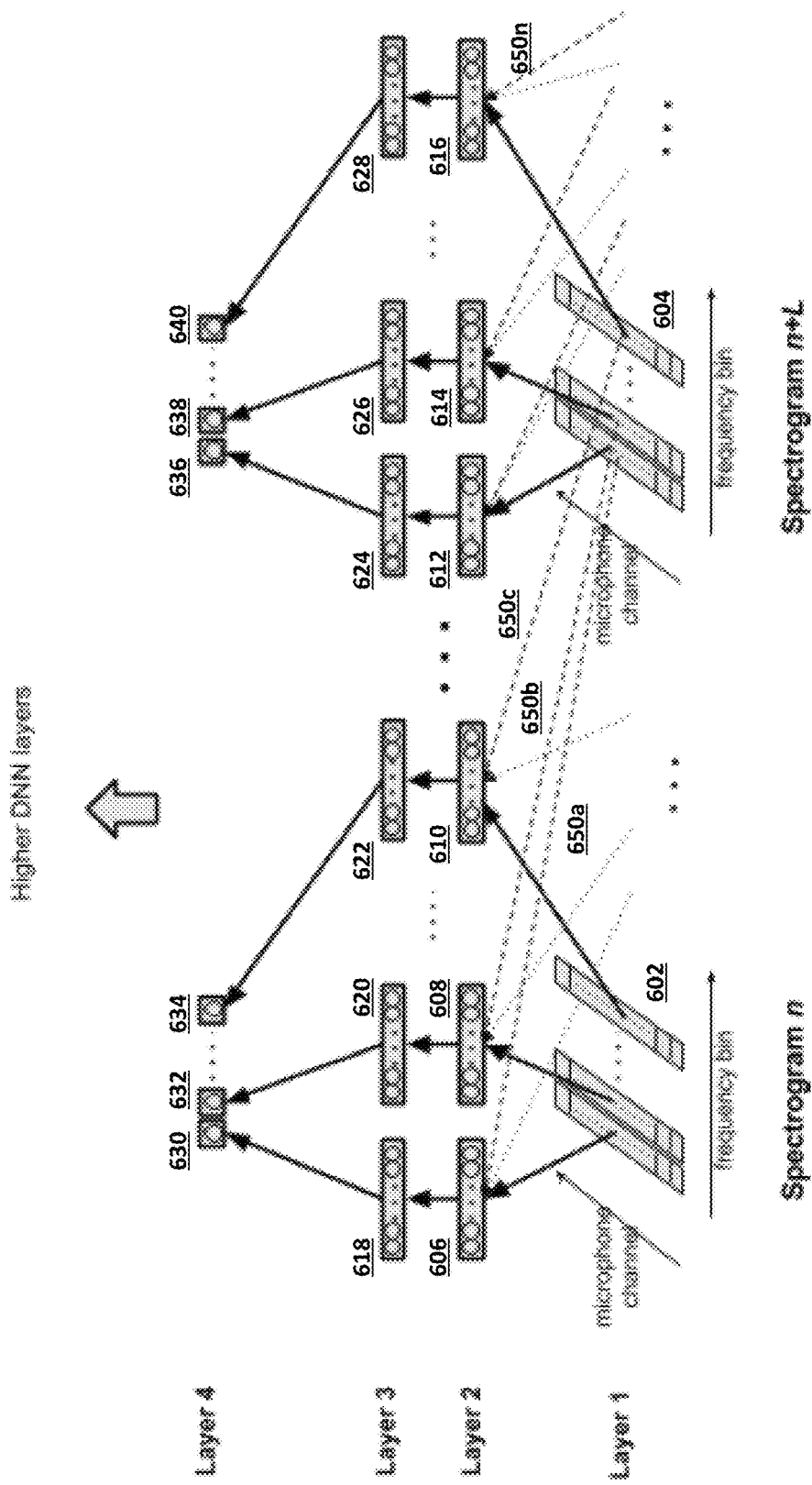
FIG. 6 shows a specific example of a neural network having four neural network layers.

FIG. 6 shows a specific example of a neural network having four neural network layers, namely, Layer 1, Layer 2, Layer 3, and Layer 4, for processing sound events or features extracted from the auralized sound signals. In FIG. 6, two spectrograms, namely, Spectrogram n and Spectrogram n+L, are illustrated. It is understood that over a given length of time, audio signals may be represented as multiple spectrograms. For Spectrogram n, the first layer, that is, Layer 1, includes microphone channels representing audio inputs from multiple microphones and frequency bins for each of the microphone channels, as illustrated in a two-dimensional coordinate 602. Likewise, for Spectrogram n+L, Layer 1 includes microphone channels representing audio inputs from multiple microphones and frequency bins for each of the microphone channels, as illustrated in a two-dimensional coordinate 604. Additional information on the sources of sound signals may be included in Layer 1. For example, the direction or distance of the sound source with respect to each of the microphones may be included in Layer 1. For moving sound sources, Layer 1 of Spectrogram n and Spectrogram n+L, may include microphone channels representing audio inputs that vary over time.

In some implementations, digitized samples of sound signals received from the microphones may be convolved with finite-duration impulse response (FIR) filters of prescribed lengths, and the outputs of the FIR filters are added together as follows:

$$y(n) = \Sigma_i h_i(n) * x_i(n)$$

where $x_i(n)$ and $h_i(n)$ are the ith channel microphone signal and the corresponding ith FIR filter, respectively. In the frequency domain, the convolution of the sound signal received from the ith channel microphone and the corresponding ith FIR filter may simply be replaced by a multiplication, that is:

$$Y(f) = \Sigma_i H_i(f) X_i(f)$$

Since the input features to a neural network are usually frequency-domain based representations of the signals, modeling the FIR filter within the neural network may be relatively straightforward in the frequency domain. Modeling the FIR filter response in the frequency domain may require that the parameters corresponding to the FIR filter be complex numbers, however. In an embodiment, additional non-linear post-processing, for example, by enhancing signals in one spectrum or suppressing signals in another spectrum, may be applied to the signals in the frequency domain.

In an embodiment, the second layer, that is, Layer 2 in FIG. 6, includes a plurality of nodes, such as a set of nodes 606, 608, . . . 610 for Spectrogram n, and a set of nodes 612, 614, . . . 616 for Spectrogram n+L. In an embodiment, each node of Layer 2 may be interpreted as a virtual beamformer with a certain look direction. In another embodiment, each node of Layer 2 may be regarded as a modeled response of a virtual beamformer capable of forming combined beams in various look directions. The responses of virtual beamformers in various look directions may be modeled in various manners. For example, in one implementation, the modeled response of a virtual beamformer from multiple look directions may be produced by forming a linear combination of certain basis vectors, that is:

$$Y(f, \theta) = \alpha_1(\theta) \Sigma_i H_i^1(f) X_i(f) + \ldots + \alpha_K(\theta) H_i^K(f) X_i(f)$$

where θ is the angle corresponding to a particular look direction of the multi-microphone array, and $\alpha_i(\theta)$ is a scale factor for the ith basis vector at the angle θ. Such a model can be adequately represented in one or more of the four layers of the neural network. For example, each node in Layer 2 of the neural network as shown in FIG. 6 may be interpreted as one of the basis functions in Equation (3), representing the modeled response of the virtual beamformer from one of a plurality of look directions (i=1, 2, . . . ). In an embodiment, by providing a large number of units per frequency bin in Layer 2, more degrees of freedom may be provided for modeling the virtual beamformer responses across different directions and distances.

In an embodiment, each node in the third layer, that is, Layer 3 as shown in FIG. 6, may be interpreted as the virtual beamformer response across various look directions. In FIG. 6, Layer 3 includes a plurality of nodes, such as a set of nodes 618, 620, . . . 622 for Spectrogram n, and a set of nodes 624, 626, . . . 628 for Spectrogram n+L. In an embodiment, each node in Layer 3 may be regarded as a weighted interpolation of virtual beamformer responses across various look directions. Alternatively, each of node in Layer 3 may be regarded as a combination of the basis functions according to the equation above for deriving Y(f, θ). In an embodiment, with sufficient numbers of nodes or units in Layers 2 and 3, the neural network may be able to gain knowledge, that is, to be trained to model various phenomena of sounds, for example, non-linear relationships due to wave diffraction and scattering effects, or other effects that may be inherent to some microphone arrays in some environments. Referring to FIG. 6, the combined virtual beamformer responses across various directions generated in Layer 3 are transmitted to Layer 4, which includes a plurality of nodes 630, 632, . . . 634 for Spectrogram n and a plurality of nodes 636, 638, . . . 640 for Spectrogram n+L.

In an embodiment, in addition to the spectrogram features, the direction and distance features of the sound sources may also be provided to the neural network as optional inputs. Direction and distance features may be provided to one of the layers in the neural network, depending on the needs of a particular application. For example, instead of feeding the direction and distance features to Layer 1 as described above, these features may be provided to Layer 3 because the selection of desired virtual beamformer responses may occur in Layer 3 or above in the neural network. In another alternative, the direction and distance features may be provided to Layer 2, in which virtual beamformer responses are generated from certain look directions, before the virtual beamformer responses across various look directions are weighted, interpolated or combined.

In some applications, it may be desirable to capture the temporal relationships of sound signals in each frequency bin. In some applications, it may be desirable to combine surrounding temporal outputs of each frequency bin as a convolutional neural network (CNN). This combination may be regarded as having the effect of extending the filter length of the virtual beamformer.

FIG. 6 also illustrates an example of combining surrounding temporal outputs of each frequency bin to capture temporal relationships in the neural network. The outputs from the surrounding past and future samples of a given frequency bin may be combined from various microphone channels to form a convolutional neural network. In an embodiment, the temporal relationships between the frequency bins are captured by incorporating a convolutional network, from Layer 1 to Layer 2, as illustrated by dashed arrows 650a, 650b, 650c, . . . 650n, for example, between different time instances of the frequency bins.

Unlike single-channel sound recognition, multi-channel sound recognition with multiple microphones may require phase information because spatial characteristics of the sound source may be derived from the phases of sound signals received by those microphones. For frequency-domain based features, both the magnitude and phase information from each of the sound channels may be provided to the neural network. At least one layer of the neural network may be required to process complex numbers. In one example, the complex numbers may be processed in Layer 2 of the neural network. A complex number may be in the form of a real component and an imaginary component, or alternatively, in the form of a magnitude and a phase. In Layer 2 of the neural network, for example, each unit or node may receive complex inputs and produce a complex output. In this example, a neural unit with complex inputs and a complex output may be a relatively straightforward setup for Layer 2. In one example, the net result U within a complex unit is given by:

$$U = \Sigma_i W_i X_i + V$$

where $W_i$ is the complex-valued weight connecting complex-valued inputs, and V is the complex-valued threshold value. In order to obtain the complex-valued output signal, the net result U is converted into real and imaginary components, and these real and imaginary components are passed through an activation function $f_R(x)$ to obtain an output $f_{out}$, given by $$f_{out} = f_R(\Re(U)) + i f_R(\Im(U))$$

where $$f_r(x) = \frac{1}{1+e^{-x}},$$

x ∈R, for example. Various other complex-value computations may also be implemented within the scope of the disclosure.

In another embodiment, Layer 1 and Layer 2 of the neural network may involve complex computations whereas the upper layers, for example, Layer 3 and Layer 4, may involve computations of real numbers. For example, each unit or node in Layer 2 of the neural network may receive complex inputs and produce a real output. Various schemes may be implemented to generate a real output based on complex inputs. For example, one approach is to implement a complex-input-complex-output unit and to make the complex output real by simply taking the magnitude of the complex output:

$$f_{out} = |f_R(\Re(U)) + i f_R(\Im(U))|$$

Alternatively, another approach is to apply the activation function on the absolute value of the complex sum, that is:

$$f_{out} = fR(|U|)$$

In another alternative approach, each complex input feature is broken down into either the magnitude and phase components or the real and imaginary components. These components may be regarded as real input features. In other words, each complex number may be regarded as two separate real numbers representing the real and imaginary components of the complex number, or alternatively, two separate real numbers representing the magnitude and phase of the complex number.

Figure 7:
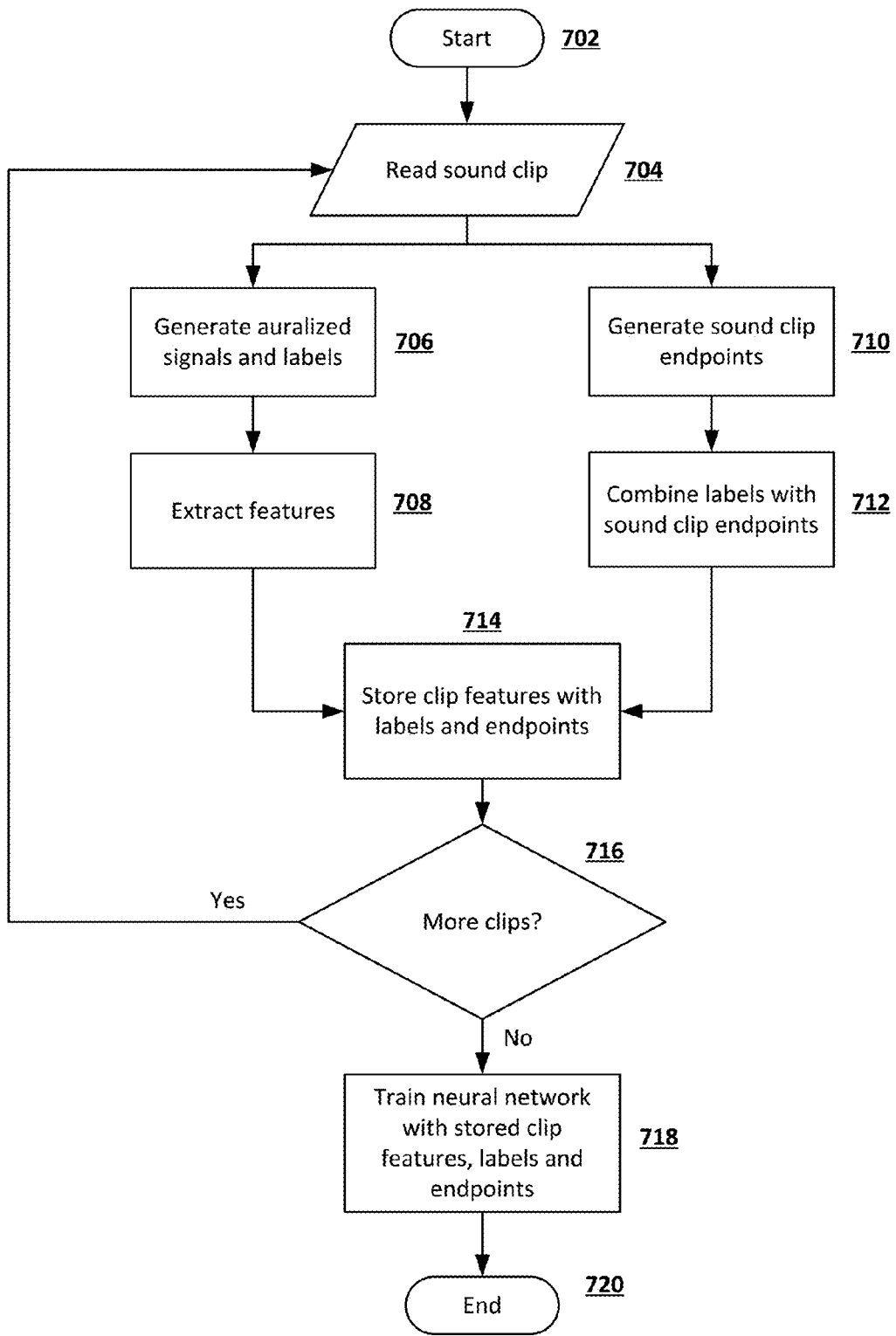
FIG. 7 shows a flowchart illustrating an example of a process for training a neural network for sound source estimation.

FIG. 7 shows a flowchart illustrating an example of a process for training a neural network for sound source estimation. The process starts in block 702, and a sound clip is read in 704. The sound clip may include sound signals generated by a stationary or moving sound source. Auralized multi-channel signals and their corresponding signal labels are generated in block 706. The auralized multi-channel signals and their corresponding signal labels may be generated by the auralizer 410 in FIG. 4, for example. After the auralized multi-channel signals are generated in block 706, features may be extracted from the auralized multi-channel signals in block 708. The features may be extracted from the auralized multi-channel signals by using a feature extractor 416 in FIG. 4, for example. The features may be any of various representations that are indicative of a magnitude and a phase, including, for example, a log magnitude and phase, log magnitude and inter-channel phase difference, log magnitude and an inverse-frequency-weighted inter-channel phase difference, a log magnitude and sine/cosine of a phase, a log magnitude and difference of the sine/cosine of phase, a log magnitude and sine/cosine of the inter-channel phase difference, or the like, as described above. Various other forms of values indicative of magnitude and phase may also be extracted as features from auralized multi-channel signals within the scope of the disclosure.

In FIG. 7, after the sound clip is read in block 704, two endpoints of the sound clip are generated in block 710. The labels generated in block 706 are combined with the endpoints of the sound clip in block 712. After the features are extracted in block 708 and the labels are combined with the sound clip endpoints in block 712, the features extracted from the auralized signals in the sound clip and the associated labels and endpoints are stored in block 714. In some implementations, more than one sound clip may be read and auralized. A determination may be made as to whether more sound clips need to be read in block 716. If it is determined that one or more sound clips need to be read in block 716, then an additional sound clip is read in block 704, and the processes of generating auralized signals and corresponding labels in block 706, extracting features from the auralized signals in block 708, generating endpoints of the sound clip in block 710, combining the labels with the endpoints in block 712, and storing the features, labels and endpoints in block 714 are repeated. If it is determined that no more sound clips are to be read in block 716, then the neural network may be trained with the stored features, labels and endpoints of one or more sound clips in block 718. After the neural network is trained, the process ends in block 720.

Figure 8:
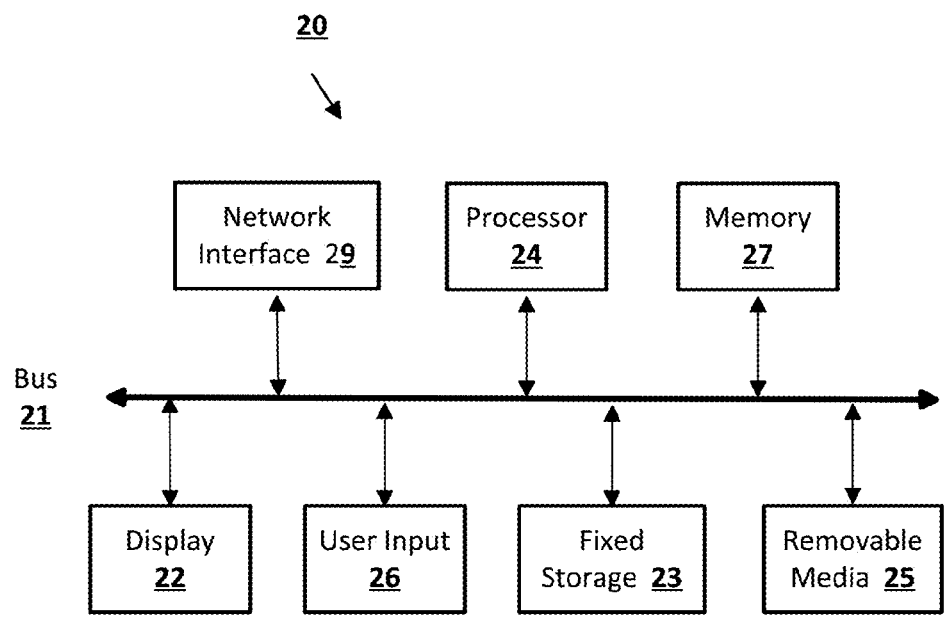
FIG. 8 shows an example of a computing device according to embodiments of the disclosed subject matter.

Embodiments of the presently disclosed subject matter may be implemented in and used with a variety of component and network architectures. For example, the neural network 12 as shown in FIG. 1 may include one or more computing devices for implementing embodiments of the subject matter described above. FIG. 8 shows an example of a computing device 20 suitable for implementing embodiments of the presently disclosed subject matter. The device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, Wi-Fi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all of the components shown in FIG. 8 need not be present to practice the present disclosure. The components can be interconnected in different ways from that shown. The operation of a computer such as that shown in FIG. 8 readily known in the art and is not discussed in detail in this application. Code to implement the present disclosure can be stored in computer-readable storage media such as one or more of the memory 27, fixed storage 23, removable media 25, or on a remote storage location.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor or an Application Specific Integrated Circuit (ASIC) that embodies all or part of the techniques according to embodiments of the disclosed subject matter in hardware or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

In some embodiments, the microphones 10a, 10b, 10c and 10d as shown in FIG. 1 may be implemented as part of a network of sensors. These sensors may include microphones for sound detection, for example, and may also include other types of sensors. In general, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, entry, presence, pressure, light, sound, and the like. A sensor also may be described in terms of the particular physical device that obtains the environmental information. For example, an accelerometer may obtain acceleration information, and thus may be used as a general motion sensor or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment. For example, a sensor may operate as a security sensor when it is used to determine security events such as unauthorized entry. A sensor may operate with different functions at different times, such as where a motion sensor is used to control lighting in a smart home environment when an authorized user is present, and is used to alert to unauthorized or unexpected movement when no authorized user is present, or when an alarm system is in an "armed" state, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, or other sensors. Such a housing also may be referred to as a sensor or a sensor device. For clarity, sensors are described with respect to the particular functions they perform or the particular physical hardware used, when such specification is necessary for understanding of the embodiments disclosed herein.

Figure 9:
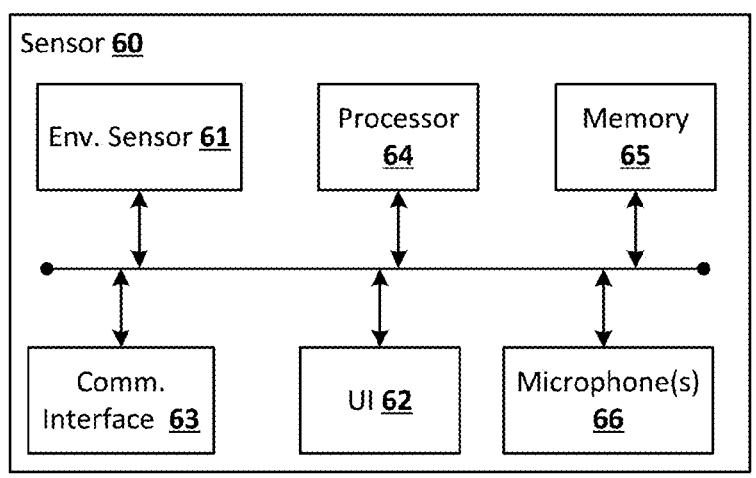
FIG. 9 shows an example of a sensor according to embodiments of the disclosed subject matter.

A sensor may include hardware in addition to the specific physical sensor that obtains information about the environment. FIG. 9 shows an example of a sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, pressure sensor, microphone, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices. A user interface (UI) 62 may provide information or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a limited-output display, or it may be a full-featured interface such as a touchscreen. Components within the sensor 60 may transmit and receive information to and from one another via an internal bus or other mechanism as will be readily understood by one of skill in the art. Furthermore, the sensor 60 may include one or more microphones 66 to detect sounds in the environment. One or more components may be implemented in a single physical arrangement, such as where multiple components are implemented on a single integrated circuit. Sensors as disclosed herein may include other components, or may not include all of the illustrative components shown.

Sensors as disclosed herein may operate within a communication network, such as a conventional wireless network, or a sensor-specific network through which sensors may communicate with one another or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Moreover, the smart-home environment may make inferences about which individuals live in the home and are therefore users and which electronic devices are associated with those individuals. As such, the smart-home environment may "learn" who is a user (e.g., an authorized user) and permit the electronic devices associated with those individuals to control the network-connected smart devices of the smart-home environment, in some embodiments including sensors used by or within the smart-home environment. Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services or communication protocols.

A smart-home environment may include communication with devices outside of the smart-home environment but within a proximate geographical range of the home. For example, the smart-home environment may communicate information through the communication network or directly to a central server or cloud-computing system regarding detected movement or presence of people, animals, and any other objects and receives back commands for controlling the lighting accordingly.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method for detecting a location of a first sound source, comprising:
   generating, by a processor and without information about locations of microphones of a plurality of microphones, a plurality of auralized signals based at least on a plurality of anechoic impulse responses of the plurality of microphones in response to a sound event generated by a second sound source and further based on a plurality of room impulse responses of the plurality of microphones, such that each auralized signal is associated with one of the plurality of microphones and is based on one of the anechoic impulse responses and on one of the room impulse responses, the second sound source being a training sound source;
   extracting, by the processor and after generation of the plurality of auralized signals, a plurality of features from each of the plurality of auralized signals, each of the features including at least information regarding a magnitude and a phase of a corresponding one of the plurality of auralized signals;
   generating, by the processor and after generation of the plurality of auralized signals, a plurality of labels, each corresponding to a respective auralized signal in the plurality of auralized signals, each of the plurality of labels including at least spatial information regarding an estimated location of the second sound source;
   training, by the processor and after generation of the plurality of labels, a neural network for estimating the location of the first sound source based at least on the plurality of features and the plurality of labels; and
   detecting, by the processor, via the neural network, and after the neural network has been trained, the location of the first sound source.

2. The method of claim 1, wherein at least one of the first sound source or the second sound source comprises a source selected from the group consisting of: a stationary sound source and a moving sound source.

3. The method of claim 1, wherein the generating the plurality of auralized signals comprises generating an anechoic impulse response for each of the plurality of microphones in response to the sound event generated by the second sound source in an anechoic chamber, the anechoic impulse response representing an impulse response of each of the plurality of microphones in the anechoic chamber.

4. The method of claim 1, wherein the generating the plurality of auralized signals comprises generating a room impulse response for each of the plurality of microphones in a device that causes scattering of sound waves in response to the sound event generated by the second sound source in a room environment.

5. The method of claim 1, wherein the generating the plurality of auralized signals comprises generating a room impulse response for each of the plurality of microphones in a device that causes scattering of sound waves in response to the sound event generated by a room simulator that simulates a room environment.

6. The method of claim 1, wherein the generating the plurality of auralized signals comprises generating a microphone transfer function for each of the plurality of microphones.

7. The method of claim 1, wherein the generating the plurality of auralized signals comprises generating a plurality of near-microphone sounds selected from the group consisting of: speeches generated by a speech database and speeches combined with noises present in a room environment.

8. The method of claim 1, further comprising reading a sound clip that provides the sound event from the second sound source.

9. The method of claim 8, further comprising generating endpoints of the sound clip.

10. The method of claim 9, further comprising combining the plurality of labels with the endpoints of the sound clip.

11. The method of claim 10, further comprising storing the plurality of features, the plurality of labels and the endpoints of the sound clip.

12. The method of claim 11, further comprising:
reading at least one additional sound clip that provides at least one additional sound event from the second sound source;
generating additional endpoints of the at least one additional sound clip;
generating additional auralized signals based on the at least one additional sound event;
extracting additional features from the additional auralized signals; and
generating additional labels corresponding to the additional auralized signals.

13. The method of claim 12, wherein the training the neural network for estimating the location of the second sound source comprises training the neural network based at least on the additional features, the additional labels and the additional endpoints of the at least one additional sound clip.

14. An apparatus for detecting a location of a first sound source, comprising:
a memory; and
a processor communicably coupled to the memory, the processor configured to execute instructions to:
generate, without information about locations of microphones of a plurality of microphones, a plurality of auralized signals based at least on a plurality of anechoic impulse responses of the plurality of microphones in response to a sound event generated by a second sound source and further based on a plurality of room impulse responses of the plurality of microphones, such that each auralized signal is associated with one of the plurality of microphones and is based on one of the anechoic impulse responses and on one of the room impulse responses, the second sound source being a training sound source;
extract, after generation of the plurality of auralized signals, a plurality of features from each of the plurality of auralized signals, each of the features including at least information regarding a magnitude and a phase of a corresponding one of the plurality of auralized signals;
generate, after generation of the plurality of auralized signals, a plurality of labels, each corresponding to a respective auralized signal in the plurality of auralized signals, each of the plurality of labels including at least spatial information regarding an estimated location of the second sound source;
train, after generation of the plurality of labels, a neural network for estimating the location of the first sound source based at least on the plurality of features and the plurality of labels; and
detect, via the neural network and after the neural network has been trained, the location of the first sound source.

15. The apparatus of claim 14, wherein at least one of the first sound source or the second sound source comprises a source selected from the group consisting of: a stationary sound source and a moving sound source.

16. The apparatus of claim 14, wherein the instructions to generate the plurality of auralized signals comprise instructions to generate an anechoic impulse response for each of the plurality of microphones in response to the sound event generated by the second sound source in an anechoic chamber, the anechoic impulse response representing an impulse response of each of the plurality of microphones in the anechoic chamber.

17. The apparatus of claim 14, wherein the instructions to generate the plurality of auralized signals comprise instructions to generate a room impulse response for each of the plurality of microphones in a device that causes scattering of sound waves in response to the sound event generated by a room simulator that simulates a room environment.

18. The apparatus of claim 14, wherein the processor is further configured to:
read a sound clip that provides the sound event from the second sound source;
generate endpoints of the sound clip; and
combine the plurality of labels with the endpoints of the sound clip.

19. The apparatus of claim 18, wherein the processor is further configured to:
read at least one additional sound clip that provides at least one additional sound event from the second sound source;
generate additional endpoints of the at least one additional sound clip;
generate additional auralized signals based on the at least one additional sound event;
extract additional features from the additional auralized signals; and
generate additional labels corresponding to the additional auralized signals.

20. The apparatus of claim 19, wherein the instructions to train the neural network for estimating the location of the first sound source comprise instructions to train the neural network based at least on the additional features, the additional labels and the additional endpoints of the at least one additional sound clip.

21. A sound system, comprising:
a plurality of microphones;
an auralizer configured to generate:
without information about locations of the microphones of the plurality of microphones, a plurality of auralized signals based at least on a plurality of anechoic impulse responses of the plurality of microphones in response to a sound event generated by a first sound source and further based on a plurality of room impulse responses of the plurality of microphones, such that each auralized signal is associated with one of the plurality of microphones and is based on one of the anechoic impulse responses and on one of the room impulse responses, the first sound source being a training sound source; and
after generation of the plurality of auralized signals, a plurality of labels, each corresponding to a respective auralized signal in the plurality of auralized signals, each of the plurality of labels including at least spatial information regarding an estimated location of the second sound source;
a feature extractor configured to extract, after generation of the pluralized of auralized signals, the plurality of features from each of the plurality of auralized signals, each of the features including at least information regarding a magnitude and a phase of a corresponding one of the plurality of auralized signals; and
a neural network comprising one or more layers and configured to be trained, after generation of the plurality of labels, for estimation of a location of a second sound source based at least on the plurality of features and the plurality of labels and to detect, after the neural network has been trained, the location of the second sound source.

22. The sound system of claim 21, wherein the auralizer is configured to generate the plurality of anechoic impulse responses of the plurality of microphones in response to the sound event generated by the first sound source in an anechoic chamber.

23. The sound system of claim 21, further comprising a room simulator to generate the plurality of room impulse responses.

24. The sound system of claim 21, further comprising a microphone transfer function generator configured to generate a plurality of microphone transfer functions of the plurality of microphones and to transmit the plurality of microphone transfer functions to the auralizer.

25. The method of claim 1, wherein the locations of all of the microphones of the plurality of microphones do not form a linear array or a circular array.

26. The apparatus of claim 14, wherein the locations of all of the microphones of the plurality of microphones do not form a linear array or a circular array.

27. The sound system of claim 21, wherein the locations of all of the microphones of the plurality of microphones do not form a linear array or a circular array.

* * * * *